(No Model.) 4 Sheets—Sheet 1.
J. W. CULMER.
COMPUTING SCALE.
No. 552,278. Patented Dec. 31, 1895.
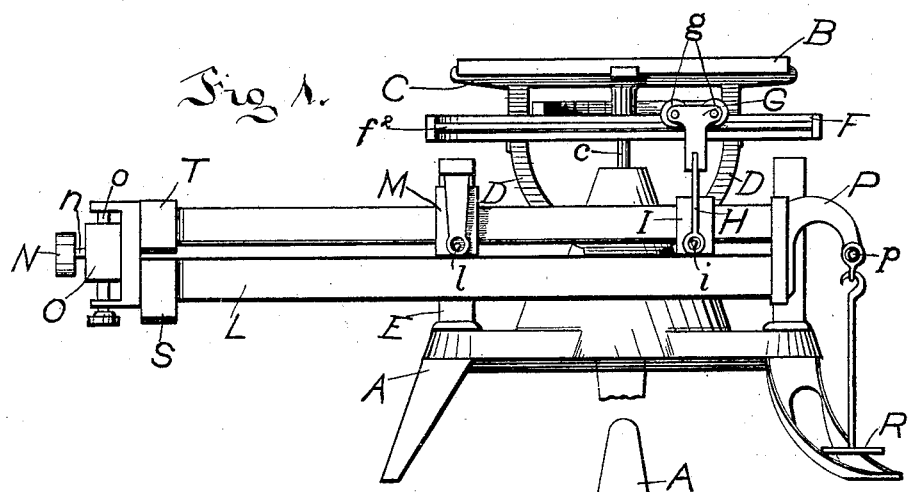
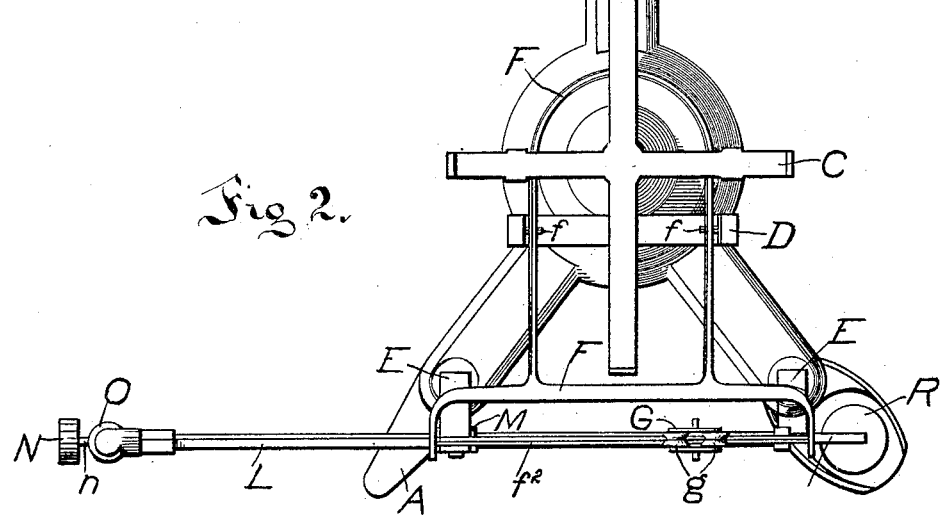
Witnesses
James E. Smith.
W. C. Grigsby.
Inventor
John W. Culmer,
By Chas. F. Benjamin
Attorney (No Model.) 4 Sheets—Sheet 2.
J. W. CULMER.
COMPUTING SCALE.
No. 552,278. Patented Dec. 31, 1895.
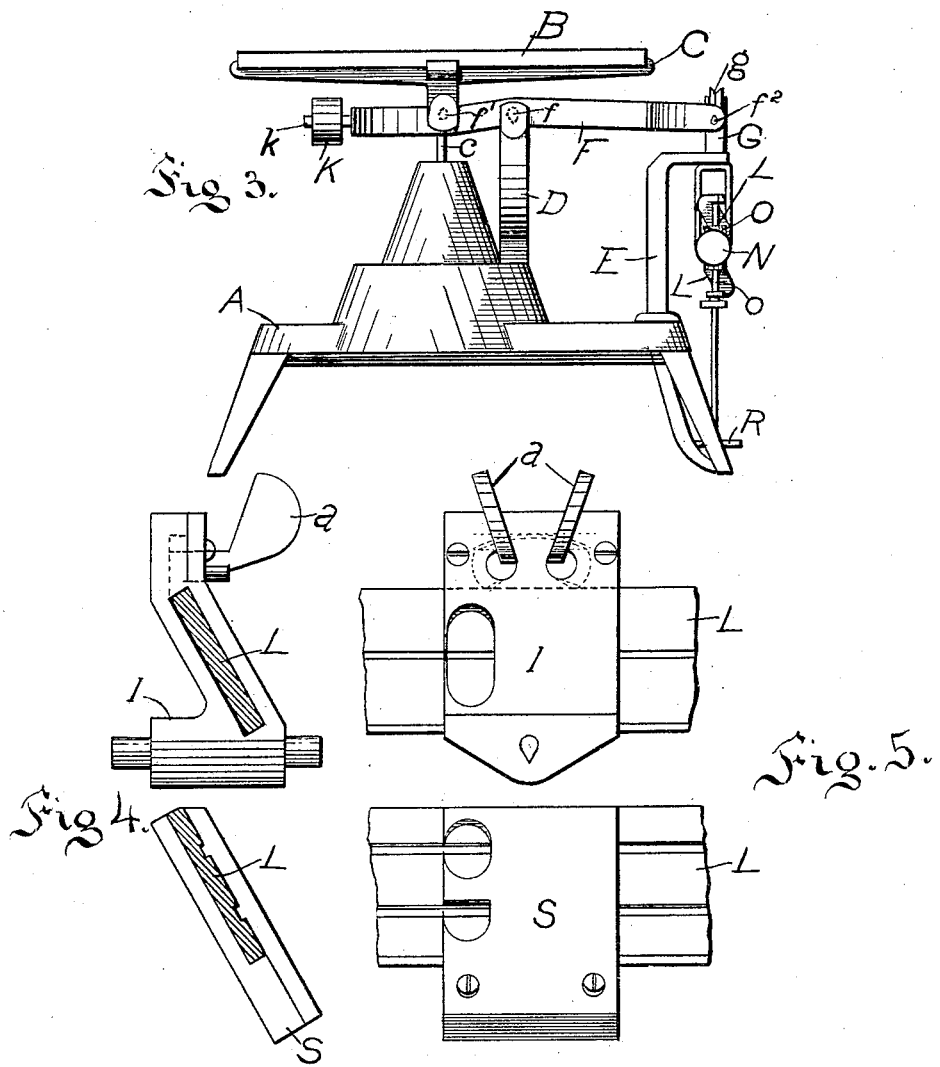

(No Model.) 4 Sheets—Sheet 3.
J. W. CULMER.
COMPUTING SCALE.
No. 552,278. Patented Dec. 31, 1895.
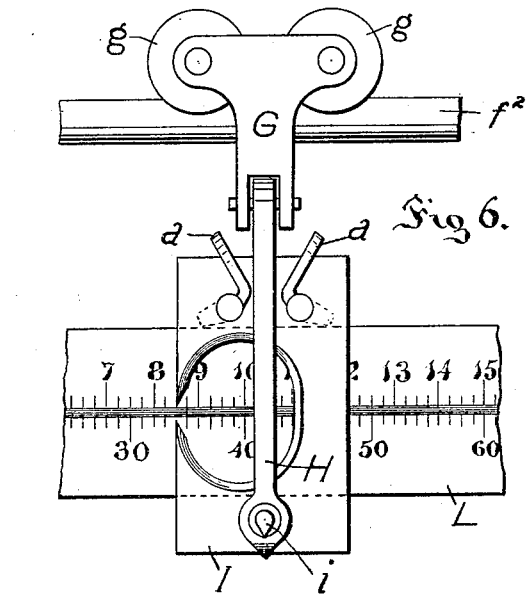
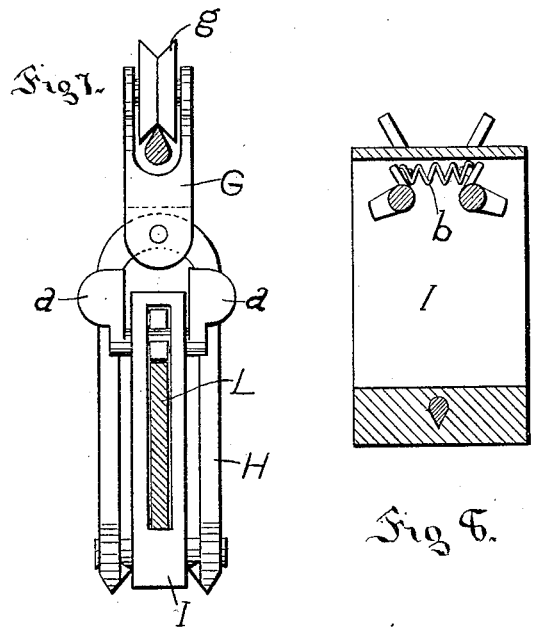
Witnesses
James S. Smith
W. C. Grigsby
Inventor
John W. Culmer,
By Chas. F. Benjamin
Attorney (No Model.) 4 Sheets—Sheet 4.

J. W. CULMER.
COMPUTING SCALE.

No. 552,278. Patented Dec. 31, 1895.

Witnesses
James S. Smith
W. C. Grigsby.

Inventor
John W. Culmer,
By Chas. F. Benjamin
Attorney

UNITED STATES PATENT OFFICE.

JOHN WOODRUFF CULMER, OF NEW BRIGHTON, PENNSYLVANIA.

COMPUTING-SCALE.

SPECIFICATION forming part of Letters Patent No. 552,278, dated December 31, 1895.

Application filed October 10, 1894. Renewed December 9, 1895. Serial No. 571,449. (No model.)

*To all whom it may concern:*

Be it known that I, JOHN WOODRUFF CULMER, a citizen of the United States, residing at New Brighton, in the county of Beaver and State of Pennsylvania, have invented certain new and useful Improvements in Computing-Scales; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to beam counter-scales, and its object is to enable the value of commodities to be computed by the operation of the scales.

The improvement I have made consists essentially in loosely fitting one end of the computing-beam with a sliding poise, pivotally hung from a trolley, which, in turn, is supported by and moves along a bar parallel with the computing-beam and forming an extended crosswise end to the lever of the scale, the said lever being flexibly connected to the weight-receiving scoop or platform and the computing-beam, and the necessary independent and separate balance of the weight-transmitting and the computing parts of the scale being secured, as well as the flexibility of connection requisite to insure an accurate working and result of the combined weighing and computing mechanism.

Figure 10:
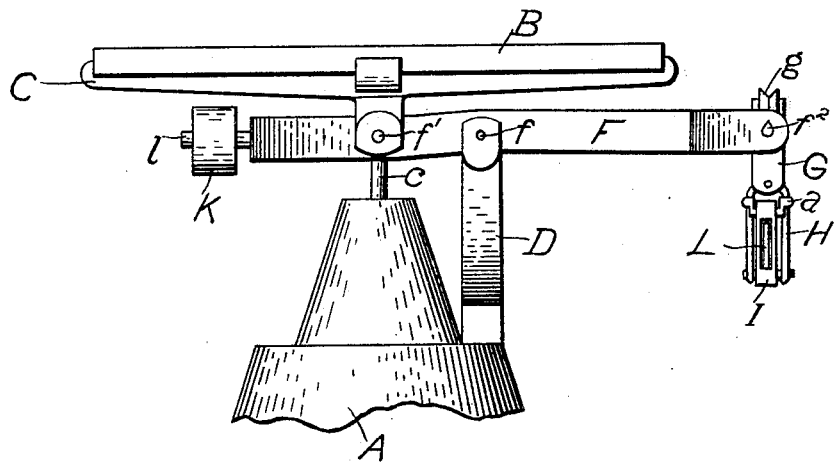
Figure 11:
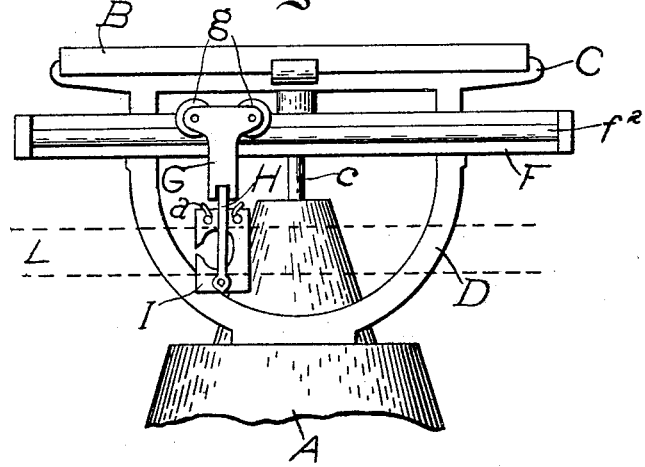

In the accompanying drawings, wherein like letters represent like parts, Figure 1 is a front elevation of my scale; Fig. 2, a top plan of the same with the scale-pan removed; Fig. 3, an end elevation exhibiting the computing-beam in vertical cross-section and in a vertical side view showing the lever of the scale; Fig. 4, a detail of end elevations indicating that the computing-beam may be arranged obliquely within its environing parts when that arrangement is preferred to a vertical elevation of said beam; Fig. 5, a detail of front elevations when the computing-beam is so obliqued; Fig. 6, a detailed front elevation showing the trolley-carried computing-block which serves as a sliding poise along one end of the computing-beam; Fig. 7, an end elevation of the same; Fig. 8, a detail in longitudinal vertical section showing the spring attachment for steadying the trolley-carried block on the computing-beam; Fig. 9, a front elevation of the computing-beam; Fig. 10, an end elevation of the scale, showing the parts that balance, in company with the lever, independently of the computing-beam; and Fig. 11, a front elevation of the same.

A is the base of the scale; B, the scale-pan; C, the frame thereof, having a stem $c$ to connect the frame with the customary equalizing-rod in the hollow of the base; D, the standard for the scale-lever, and E an additional standard for the computing-beam.

In my improvement the ordinary beam-lever is converted into a specially-devised lever F, which is yoke-shaped, modified at what is to be termed its "front end" into an elongated cross-bar, with ends bent forward, forming a bracket, all as shown. This lever has a pair of under-side fulcrum-pivots $f$ to librate it upon its standard, and to the rear of these is a pair of similar but upper-side pivots $f'$, upon which the frame for the scale-pan rests and librates. In front of the fulcrum-pivots, supported by the bent bracket-like ends of the cross-bar forming the front end of the lever, is a single long pivot or bar $f^2$, knife-edged like the others, and it is to be understood that these pivots $f$, $f'$ and $f^2$ are truly parallel, one with another, throughout.

A trolley G, by means of a pair of grooved tandem wheels $g$, is supported by and travels to and fro along the knife-edge of the long front pivot of the lever, and pivoted to or in this trolley is a depending clevis H, which carries a tall thin block I, provided with a pair of knife-edge pivots $i$, one on each side of the block and near its bottom, to support the block within the clevis.

At the rear or elliptic end of the aforesaid lever is a heavy ball K, working to and fro upon a screw-stem $k$, projected horizontally from that end of the lever, and by an adjustment of that ball the lever, librating upon its fulcrum-pivots and supporting, on one side of its fulcrum-line, the scale-pan and frame, and on the other side the trolley, clevis and block aforementioned, is brought to a balance, and the ball is to be readjusted whenever, from wear of parts or otherwise, the balance becomes impaired, though various other ways may be used to equalize the unequal weights of scale-pan and frame on one side and trolley and block on the other side.

The block I is slotted through lengthwise, which enables it to pass loosely over and along one end of a beam L, pivotally supported by the standard E of the scale-base. The beam is parallel with and below the long pivot-bar on which the trolley rides. So long as the lever F is in balance, the block moves over the beam, from end toward the center, or the reverse, without affecting the balance of beam or lever; but when weight is put into the scale-pan the block rises, pulls up the beam and destroys its balance, which can be restored by the movement of a sliding poise on the beam that will enable the beam to librate within the slot by counterbalancing the weight in the scale-pan and so putting the lever in balance again. Now if the space along the beam L capable of being traversed by the block I is properly divided and marked in price-rates, and if the space along the beam traversable by the sliding poise is divided and marked in unison with the other spacings and markings, it will follow that if, when the commodity to be sold by weight is put into the scale-pan, the block I is moved to the proper price-unit, then the sliding poise, when it effects a counterbalance, will be at the mark in its own line of figures that indicates the value of the commodity at the prescribed price per pound or ounce, as the case may happen.

Habitually the result of an operation with the computing-scale will be told in the sum to be paid for the article by the purchaser; but a purchaser may demand a demonstration of weight, official inspectors of weights and measures will from time to time need to test the accuracy of the scale, and the scale will sometimes be required for weighing without computing. Therefore there must be a sliding poise and a row of figures for these purposes, and there should be a mark to indicate where the block I must be when a known pound-weight in the scale-pan is to be counterbalanced by the weighing-poise standing at the one-pound mark in the row of weight-figures.

Scalemakers will use their judgment, skill and ingenuity for themselves, severally, in arranging the details of the beam L and coordinating the functions of its several elements, for this combination of the lever F, balanced (with its dependencies on either side of its fulcrum) independently of the beam, and the beam L, also (with its dependents or burdens) balanced independently of the lever, is capable of many variations in the arrangement of the beam for computation or weighing. One arrangement, devised by myself, I will now describe.

The beam L is divided into two parallel bars, one above the other, joined only at their ends. The beam is hung from its standard by a pair of knife-edge pivots $l$, attached to a fixed block M, which divides the upper bar into two substantially equal portions. At one end the beam is balanced by a gravity-ball N, moving upon a screw-stem $n$, projected horizontally from the beam, and to insure great nicety of balance I prefer to fix this stem in a block O, moving vertically between the top and bottom edges of the beam, by means of a screw $o$, working through offsets formed by recessing the end of the beam. At the other end of the beam I swing upon knife-edge pivots $p$, fixed to a goose-neck bracket P, a seat R, upon which movable weights can be placed to help make a balance.

That part of the upper bar of the beam which is between its fulcrum and its right-hand end I space and mark into a row of figures, denoting price-rates from five to twenty-five cents, leaving room at the end of the row for the block I to rest without interfering with the notation. Then beneath that row I mark another row on the same bar of fourfold value, so that the mark fifteen cents in the upper row, for example, stands for sixty cents in the lower row. The face of the block I is cut away to form a pair of pointers for the convenient reading of these two rows of price figures.

The lower bar of the computing-beam is spaced and marked from left to right along its length into a top row of figures, denoting value when read in connection with the top row of figures of the upper bar; into a middle row, denoting value when read in connection with the lower row of figures on the upper bar, and into a bottom row of figures, denoting weight in pounds and fractions when the scale is to be tested for accuracy, or weighing alone is required. In the arrangement of these rows on the lower bar, similarly to the arrangement of the upper bar, room is left at the left-hand end of the beam for the resting of a sliding poise S, the face of which is cut away to form pointers for the convenient reading of each of the rows of figures.

That part of the upper bar of the beam L which is between the fulcrum and the left-hand end of the beam affords scope for the movement of a sliding poise T, which can be pushed out from its place of rest at the left-hand end of the beam to balance the weight of any receiving-vessel put into the scale-pan, and so make the necessary allowance for tare. It is obvious, however, that, by varying the particular arrangement herein shown and described, this space on the left-hand side of the upper bar may be divided, marked and used for denoting value or weight, or both.

The mode of suspending the block I within its supporting-clevis would naturally cause it to topple on the edge of the computing-beam and so put it out of balance, besides disabling the block as an indicator. Therefore I fit in and within the head of the block a pair of thumb-levers $a$, spread by a spring $b$, so that the bottoms of these levers bear gently on the edge of the beam without interfering with its balance and thus keep the block upright and steady. When the block is to be moved along the beam, the protruding tops of the levers are pressed between the thumb and forefinger of the operator, thus lifting the bottom ends of the levers clear of the beam.

Suppose the lever and beam to be connected, each in independent balance, as herein described, and a roast of meat, at eighteen cents per pound, is to be computed. The meat is put into the scale, and the block I is moved till its pointer is at the mark for eighteen cents on the upper row of price-rates on the upper bar. The poise S is then moved from left to right along the lower bar till the whole scale is in balance, and the top pointer of that poise will tell the value of the joint.

My lever F, provided with the fulcrum-pivots $f$, and carrying at one end and parallel with said pivots the long bar $f^2$, is adapted without material alteration of form or arrangement to operate or co-operate with various kinds of computing-scales, including those particularly in which the computing-beam is placed above the lever, instead of below it, as in the present scale. Hence nothing in this specification is meant to estop me from showing and claiming, in another and separate application, the combination of the aforesaid lever and bar in such manner as may consist with the true scope of the invention embraced in such combination.

Having thus described my invention, I claim the following:

The combination, in a beam counter scale, of the hollow base, pan-supporting frame, and weighing pan of such a scale; the lever, pivotally supporting the weighing pan and its frame, and having, at one end, the long crosswise pivot and, at the other, an adjustable balance weight, and librating upon center pivots seated in a standard rising from the scale base—said pivots being parallel with the long crosswise pivot aforesaid; the trolley, with its tandem wheels, riding upon and along the crosswise end pivot of the said lever; the clevis, pivotally and at right angles, hanging from said trolley; the tall, thin slotted block within said clevis and, near its bottom, pivoted thereto; the computing beam, centrally supported by and librating upon a standard rising from the scale base, below and parallel with the long crosswise end pivot of the lever aforesaid, and having one of its ends passed loosely through the aforesaid clevis-carried, trolley-supported and moving block, and being suitably provided with adjustable end weights adapted to balance said beam upon its supporting pivots, and further provided with sliding poises resting on said beam, and having its face graduated into spaces and marks for the denotation of weight, price and value—the aforesaid moving block being also provided with spring-controlled, finger-operated levers bearing upon the upper edge of said beam; the whole combination constructed and arranged as shown and described, for the purposes of enabling the weighing and computing parts of such a scale to be put in balance, and to connect the weighing and computing sections of such a scale flexibly and coordinately together, and to adapt the same to the several or varied operations of denoting weight, price and value, all in the manner hereinbefore fully explained.

In testimony whereof I affix my signature in presence of two witnesses.

JOHN WOODRUFF CULMER.

Witnesses:
FRANK B. MARLOW,
G. S. EBERHART.